US00RE37502B1

(19) United States
(12) Reissued Patent
Siccardo

(10) Patent Number: US RE37,502 E
(45) Date of Reissued Patent: Jan. 8, 2002

(54) FIXATION OF CATHODE RAY TUBE IN TV RECEIVER CABINET

(75) Inventor: Giovanni Siccardo, Bercamo (IT)

(73) Assignee: U.S. Philips Corporation, New York, NY (US)

(21) Appl. No.: 09/443,252

(22) Filed: Nov. 17, 1999

Related U.S. Patent Documents

Reissue of:
(64) Patent No.: 5,691,781
Issued: Nov. 25, 1997
Appl. No.: 08/673,784
Filed: Jun. 20, 1996

(51) Int. Cl.[7] ..... H04N 5/655
(52) U.S. Cl. ..... 348/827; 348/789; 348/825; 348/826; 348/836; 358/507
(58) Field of Search ..... 358/296, 298, 358/507; 348/823, 824, 825, 826, 827, 836; 345/905

(56) References Cited

U.S. PATENT DOCUMENTS 3,048,654 A * 4/1962 Schade, Sr. ..... 348/827
3,175,036 A * 3/1965 Miller, Jr. ..... 348/836
3,651,257 A * 3/1972 Goetz, Jr. ..... 348/826
4,758,763 A * 7/1988 Gorton ..... 348/827
5,298,984 A * 3/1994 Numata ..... 348/827
5,363,150 A * 11/1994 Kojima ..... 348/836
5,575,545 A * 11/1996 Waqng ..... 348/836

FOREIGN PATENT DOCUMENTS

AT 216593 * 11/1959 ..... 358/249
GB 2082868 * 3/1982

* cited by examiner

*Primary Examiner*—Edward L. Coles
*Assistant Examiner*—Mark Wallerson
(74) *Attorney, Agent, or Firm*—Edward W. Goodman

(57) ABSTRACT

A TV receiver includes a cabinet, a cathode ray tube (3) with a substantially rectangular screen (4) and two brackets (6) which are secured to side parts (9) of the cathode ray tube for the purpose of mounting the cathode ray tube in the cabinet. For easy mounting of electronic parts inside the cabinet, the TV receiver includes a lower and an upper cabinet part (1,2), and the brackets (6) and the lower cabinet part (1) includes portions for (12–17) temporarily positioning and holding the cathode ray tube (3) in a tilted position in the lower cabinet part for servicing purposes.

16 Claims, 4 Drawing Sheets

FIXATION OF CATHODE RAY TUBE IN TV RECEIVER CABINET

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a TV receiver comprising a cabinet, a cathode ray tube with a substantially rectangular screen and brackets which are secured to lateral parts of the cathode ray tube for mounting the cathode ray tube in the cabinet.

2. Description of the Related Art

There are many known methods by which a cathode ray tube can be mounted in a cabinet of a TV receiver. A TV receiver according to the opening paragraph is known from GB-A-2 082 868. In this document, the cathode ray tube is mounted in the cabinet by means of two brackets which have the form of hooked lugs. A first portion of each lug is secured to the cathode ray tube by bonding, i.e., with a resin adhesive. A second portion of each lug is provided with holes for securing the lug to a panel which forms a frame for the screen and which constitutes a part of the cabinet. A back cover, which forms another part of the cabinet, is secured to the panel after the cathode ray tube has been mounted in the cabinet.

TV receivers are known in which the cabinet comprises a lower box-shaped cabinet part and an upper cabinet part forming the cover of the box. In this kind of TV receiver, the cathode ray tube is fastened in the lower cabinet part with screws. However, a source of problems is the fact that, during mounting, the cathode ray tube electronic circuitry (like circuit boards and wiring) must be arranged inside the cabinet between the walls of the cabinet and the cathode ray tube. The electronic parts are mostly fastened to the inner bottom wall of the cabinet. Simultaneously mounting the heavy cathode ray tube and inserting and fastening the electronic parts in the lower cabinet part causes difficulties because there is too little free space between the bottom of the cabinet and the tube, which is a hindrance to operations. Also, the accessibility during repair operations can pose problems.

SUMMARY OF THE INVENTION

It is an object of the present invention to provide a TV receiver which overcomes this mounting problem.

The present invention provides a TV receiver comprising a cabinet, a cathode ray tube with a substantially rectangular screen and two brackets which are secured to lateral parts of the cathode my tube for the purpose of mounting the cathode ray tube in the cabinet, characterized in that the cabinet comprises a lower and an upper cabinet part, and that said brackets and said lower cabinet part comprise means for temporarily positioning and holding the cathode ray tube in a tilted position in the lower cabinet part for servicing purposes.

Before mounting of the cathode ray tube in the lower cabinet part, the two brackets are fastened to lateral parts of the tube. Normally, the brackets will be fastened to an implosion protection rim surrounding the tube. The cathode ray tube can then be positioned in the lower cabinet part by means of the two brackets, in a forward-tilted position. This leaves sufficient space between the lower side of the cathode ray tube and the bottom wall of the lower cabinet part to allow insertion and fastening of electronic parts. Thereafter, the tube is repositioned in a mounting position and fastened to the walls of the lower cabinet part. To complete the mounting, the upper cabinet part is then fastened to the lower cabinet part.

The means for temporarily positioning and holding the cathode ray tube in a tilted position in the lower cabinet part may be characterized in that each bracket comprises a hook near a central portion and a protrusion at a lower end portion of the bracket, and that said lower cabinet part comprises rims and ribs for cooperation with the hooks and the protrusions, for suspending and holding the cathode ray tube in its tilted position, respectively. The cathode ray tube is, when in a forward pivoted position, suspended on rims of the lower cabinet part by means of the hooks in the brackets and, at the same time, the protrusion at the lower end portion of each bracket abuts against a rib of the inner wall of the lower cabinet part.

Each bracket comprises a resilient stud at its end portion for the purpose of fastening the brackets to the cathode ray tube, and the cathode ray tube comprises a mounting eyelet at each corner of the screen for receiving the studs. In this way, the brackets may be easily snap-mounted to the cathode ray tube.

For securing the cathode ray tube in the cabinet, the brackets are each provided with only one hole for receiving a fastener for fastening the bracket in the lower cabinet part. The cathode ray tube is, of course, further supported by supporting ribs of the cabinet.

The present invention will now be described, by way of example, with reference to the accompanying drawings, wherein:

DESCRIPTION OF THE PREFERRED EMBODIMENT

Figure 1A:
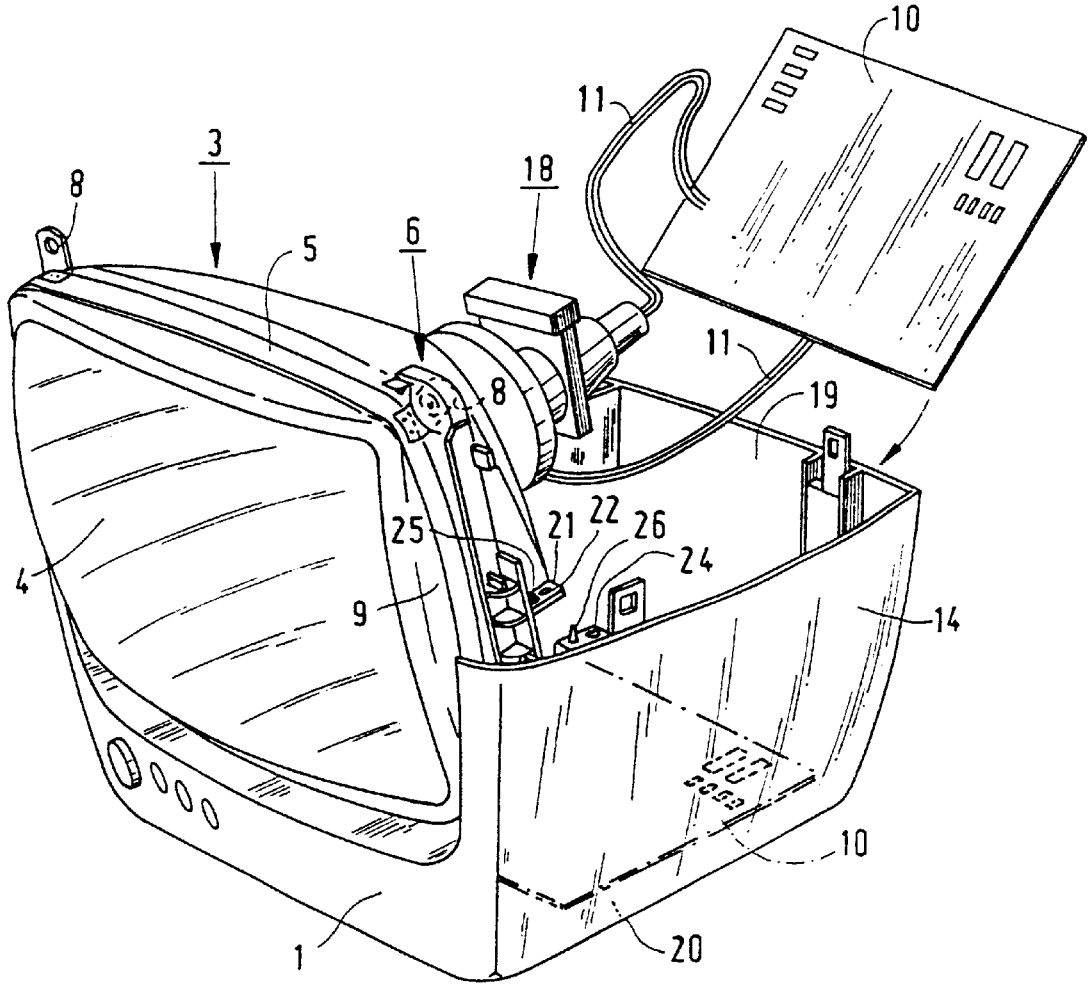
FIG. 1A is a perspective view of a TV receiver in which the cathode ray tube is placed in the lower cabinet part in a tilted position for servicing purposes.
Figure 1B:
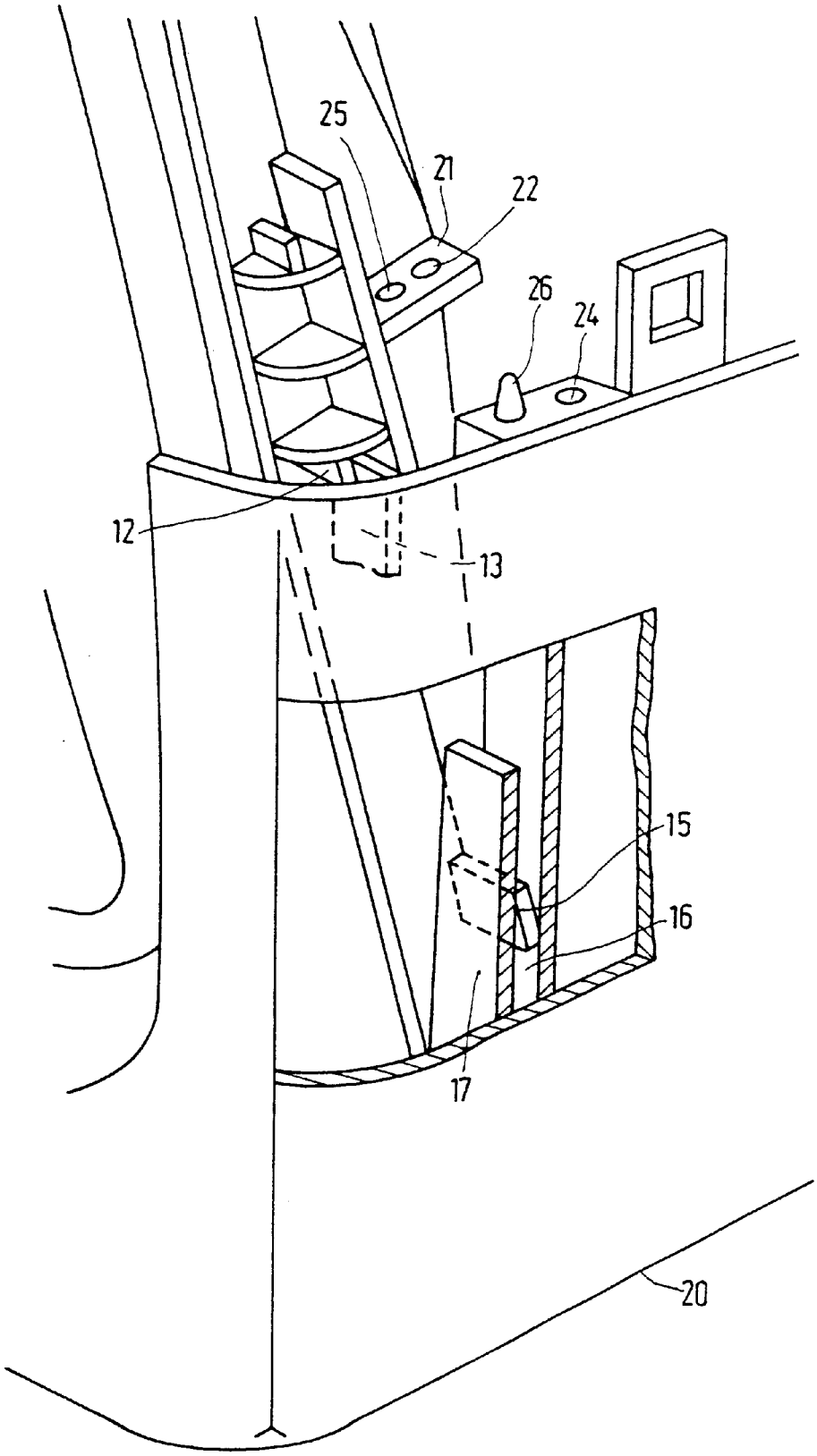
FIG. 1B is a perspective detailed view of FIG. 1A.
Figure 2:
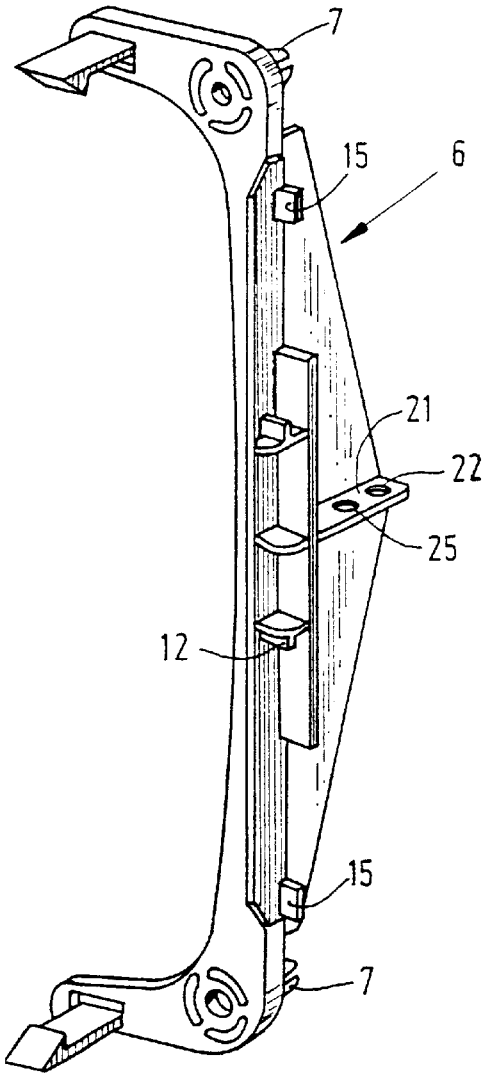
FIG. 2 is a perspective view of the bracket used for mounting the cathode ray tube in the cabinet.
Figure 3:
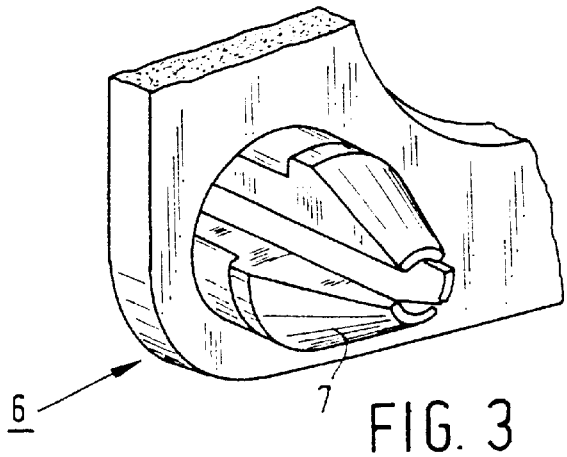
FIG. 3 is an enlarged perspective view of the lower end of the bracket of FIG. 2.

The TV receiver comprises a lower cabinet part 1, an upper cabinet part 2 (see FIG. 4) and a cathode ray tube (CRT) 3 with a substantially rectangular green 4. Near the screen, an implosion protection rim 5 surrounds the CRT. Two brackets 6 are applied for mounting the CRT 3 in the lower cabinet part. A resilient stud 7 is provided at each end portion of a bracket (see FIG. 2), and, there is a mounting eyelet 8 at each corner of the implosion protection rim 5. The brackets are mounted to lateral parts 9 of the CRT by snapping the studs 7 into their respective mounting eyelets 8. Electronic parts, such as a printed circuit board 10 with components on it, are connected to the CRT by means of flexible wires 11. The CRT can be placed in the cabinet in a forward-tilted position for easy mounting of such electronic parts to the inside bottom of the lower cabinet part 1. For this purpose, each bracket 6 comprises a hook 12 near its central portion, and each side wall 14 of the lower cabinet wall comprises a rim 13 extending inward perpendicular to said side wall 14. The CRT with the brackets mounted thereto is pivoted forward and then the hooks 12 of the brackets are suspended over the corresponding rims 13 of the side walls of the cabinet part. To prevent a further pivoting or return pivoting of the CRT, a protrusion 15 at the lower end portion of the bracket 6 is locked between two inner ribs 16 and 17 of the lower cabinet part. (See FIG. 1B). The cone part 18 of the CRT is now pivoted up so that, between the CRT and the rear wall 19 and the bottom wall 20 of the lower cabinet part, there is enough space for easy insertion of the printed circuit board 10 or other electronic parts, and for mounting the parts to the bottom wall 19 the cabinet.

Figure 4:
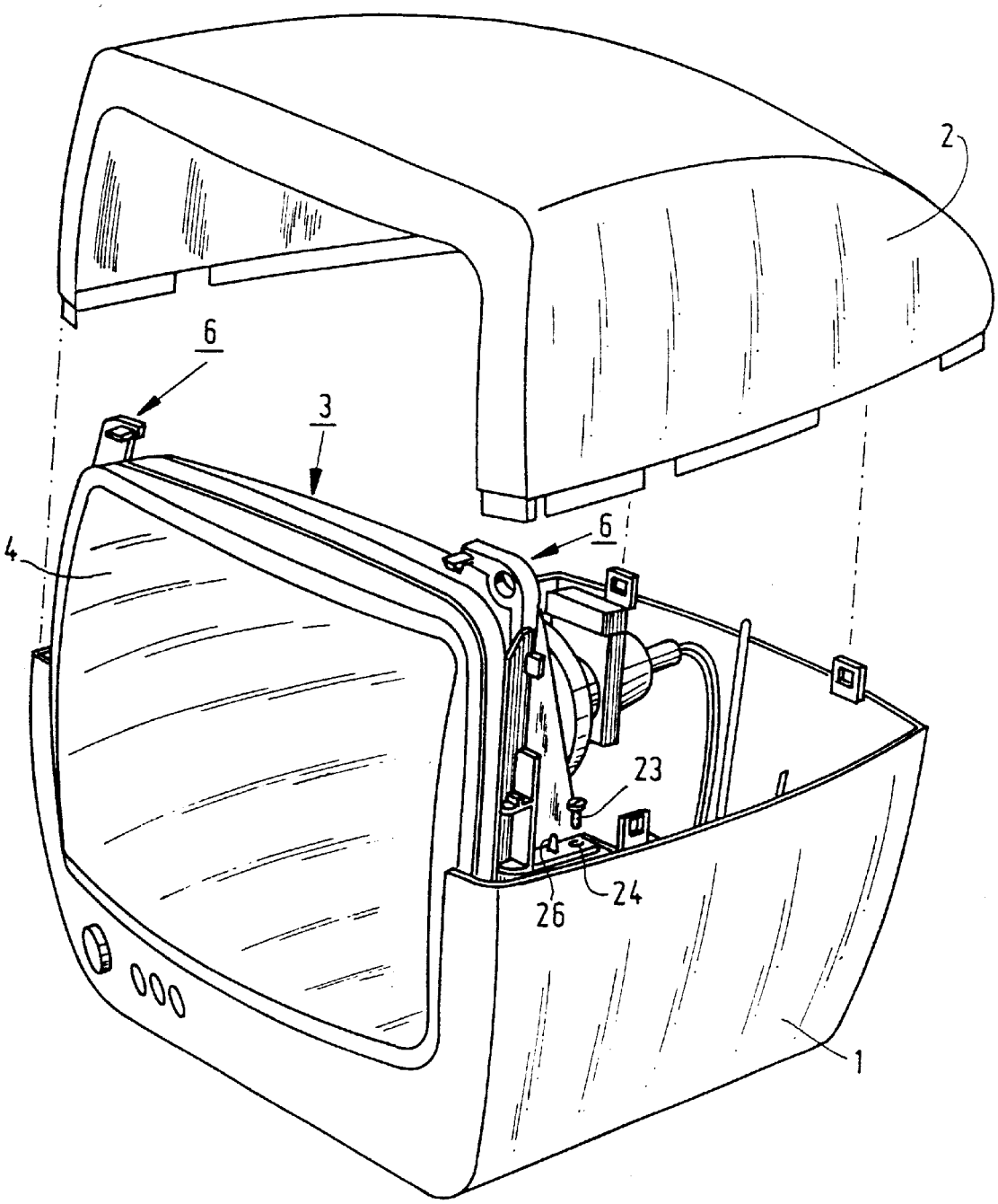
FIG. 4 is a perspective view of the TV receiver of FIG. 1, in which the cathode ray tube is mounted in the lower cabinet parts in its final position, the upper cabinet part being moved away.

For fastening the CRT in its final position, the brackets are each provided with a horizontal flange 21 having a hole 22 for receiving a fastener 23, and the side walls 14 of the lower cabinet part are provided with screw-holes 24. To mount the CRT in its final position, the CRT is lifted out of its tilted servicing position (FIG. 1) and replaced into the lower cabinet part (FIG. 4). The flange of the bracket is provided with another hole, a so-called centering hole 25, for easy location of the hole 22 in the bracket opposite the screw-hole 24 in the side wall of the cabinet, and the side wall 14 of the cabinet is provided with a tapered centering pin 26. Placing the centering pin in the centering hole of the bracket causes an automatic alignment of the hole 22 and the screw-hole 24, and thus a correct positioning of the CRT in the lower cabinet part. The CRT is further supported by the ribs 16 and 17 at the inside wall 14 of the cabinet. After fastening of the brackets with screws 23, the upper cabinet part can be snapped home on the lower cabinet part.

I claim:

1. A TV receiver comprising a cabinet, a cathode ray tube with a substantially rectangular screen and two brackets which are secured to lateral parts of the cathode ray tube for the purpose of mounting the cathode ray tube in the cabinet, characterized in that the cabinet comprises a lower and an upper cabinet part, said lower cabinet part being box-shaped and having a base on which television circuits are mounted, vertical sides and a open top portion, one of said vertical sides having an opening therein for at least partially receiving the cathode ray tube, and said upper cabinet part having a shape complementary to said lower cabinet part for receiving a remaining portion of said cathode ray tube and for closing the open top portion of said lower cabinet part, and said brackets and said lower cabinet part comprise means for temporarily positioning and holding the cathode ray tube in a tilted position in the lower cabinet part allowing access to the television circuits mounted on the base of the lower cabinet part for servicing purposes.

2. A TV receiver comprising a cabinet, a cathode ray tube with a substantially rectangular screen and two brackets which are secured to lateral parts of the cathode ray tube for the purpose of mounting the cathode ray tube in the cabinet, characterized in that the cabinet comprises a lower and an upper cabinet part, and that said brackets and said lower cabinet part comprise means for temporarily positioning and holding the cathode ray tube in a tilted position in the lower cabinet part for servicing purposes, characterized in that each bracket comprises a hook near a central portion and a protrusion at a lower end portion of the bracket, and that said lower cabinet part comprises rims and ribs for cooperation with the hooks and the protrusions, for suspending and holding the cathode ray tube in its tilted position, respectively.

3. A TV receiver as claimed in claim 1, characterized in that each bracket comprises a resilient stud at its end portion, and that the cathode ray tube comprises a mounting eyelet at each corner of the screen for receiving the studs, for snap-mounting the brackets to the cathode ray tube.

4. A TV receiver as claimed in claim 1, characterized in that each bracket comprises only one hole for receiving a fastener for fastening the bracket in the lower cabinet part.

5. A TV receiver as claimed in claim 2, characterized in that each bracket comprises a resilient stud at its end portion, and that the cathode ray tube comprises a mounting eyelet at each corner of the screen for receiving the studs, for snap-mounting the brackets to the cathode ray tube.

6. A TV receiver as claimed in claim 2, characterized in that each bracket comprises only one hole for receiving a fastener for fastening the bracket in the lower cabinet part.

7. A TV receiver as claimed in claim 3, characterized in that each bracket comprises only one hole for receiving a fastener for fastening the bracket in the lower cabinet part.

8. A TV receiver as claimed in claim 5, characterized in that each bracket comprises only one hole for receiving a fastener for fastening the bracket in the lower cabinet part.

*9. A monitor comprising a cabinet, a cathode ray tube with a substantially rectangular screen and two brackets which are secured to lateral parts of the cathode ray tube for the purpose of mounting the cathode ray tube in the cabinet, characterized in that the cabinet comprises a lower and an upper cabinet part, said lower cabinet part being box-shaped and having a base on which circuits are mounted, vertical sides and a open top portion, one of said vertical side having an opening therein for at least partially receiving the cathode ray tube, and said upper cabinet part having a shape complementary to said lower cabinet part for receiving a remaining portion of said cathode ray tube and for closing the open top portion of said lower cabinet part, and said brackets and said lower cabinet part comprise means for temporarily positioning and holding the cathode ray tube in a tilted position in the lower cabinet part allowing access to the circuits mounted on the base of the lower cabinet part for servicing purposes.*

*10. A monitor comprising a cabinet, a cathode ray tube with a substantially rectangular screen and two brackets which are secured to lateral parts of the cathode ray tube for the purpose of mounting the cathode ray tube in the cabinet, characterized in that the cabinet comprises a lower and an upper cabinet part, and that said brackets and said lower cabinet part comprise means for temporarily positioning and holding the cathode ray tube in a tilted position in the lower cabinet part for servicing purposes, characterized in that each bracket comprises a hook near a central portion and a protrusion at a lower end portion of the bracket, and that said lower cabinet part comprises rims and ribs for cooperation with the hooks and the protrusions, for suspending and holding the cathode ray tube in its tilted position, respectively.*

*11. The monitor as claimed in claim 9, characterized in that each bracket comprises a resilient stud at its end portion, and that the cathode ray tube comprises a mounting eyelet at each corner of the screen for receiving the studs, for snap-mounting the brackets to the cathode ray tube.*

*12. The monitor as claimed in claim 9, characterized in that each bracket comprises only one hole for receiving a fastener for fastening the bracket in the lower cabinet part.*

*13. The monitor as claimed in claim 10, characterized in that each bracket comprises a resilient stud at its end portion, and that the cathode ray tube comprises a mounting eyelet at each corner of the screen for receiving the studs, for snap-mounting the brackets to the cathode ray tube.*

*14. The monitor as claimed in claim 10, characterized in that each bracket comprises only one hole for receiving a fastener for fastening the bracket in the lower cabinet part.*

*15. The monitor as claimed in claim 11, characterized in that each bracket comprises only one hole for receiving a fastener for fastening the bracket in the lower cabinet part.*

*16. The monitor as claimed in claim 13, characterized in that each bracket comprises only one hole for receiving a fastener for fastening the bracket in the lower cabinet part.*

* * * * *